(12) United States Patent
Chen et al.

(10) Patent No.: US 8,793,409 B2
(45) Date of Patent: Jul. 29, 2014

(54) COMPUTER SYSTEM

(71) Applicant: Quanta Computer Inc., Tao Yuan Hsien (TW)

(72) Inventors: Tsung-Ta Chen, Tao Yuan Hsien (TW); Chih-Sheng Wang, Tao Yuan Hsien (TW); Jyun-Ching Luo, Tao Yuan Hsien (TW); Yu-Lin Chen, Tao Yuan Hsien (TW)

(73) Assignee: Quanta Computer Inc., Tao Yuan Hsien (TW)

( * ) Notice: Subject to any disclaimer, the term of this patent is extended or adjusted under 35 U.S.C. 154(b) by 0 days.

(21) Appl. No.: 13/888,846

(22) Filed: May 7, 2013

(65) Prior Publication Data

US 2014/0149610 A1    May 29, 2014

(30) Foreign Application Priority Data

Nov. 26, 2012   (TW) .............................. 101144147 A (51) Int. Cl.
*G06F 3/00* (2006.01)
*G06F 9/00* (2006.01)
*G06F 3/02* (2006.01)

(52) U.S. Cl.
CPC .................... *G06F 3/0227* (2013.01)
USPC .......... 710/16; 710/8; 710/14; 710/15; 713/1; 713/2; 713/100

(58) Field of Classification Search
None
See application file for complete search history.

(56) References Cited

U.S. PATENT DOCUMENTS

| 6,157,974 | A | * | 12/2000 | Gasparik ........................ 710/302 |
| 6,182,162 | B1 | * | 1/2001 | Estakhri et al. .................. 710/11 |
| 2002/0031032 | A1 | * | 3/2002 | Ooishi ........................... 365/226 |
| 2011/0125930 | A1 | * | 5/2011 | Tantos et al. ...................... 710/8 |
| 2012/0036284 | A1 | * | 2/2012 | Tao et al. ......................... 710/16 |
| 2012/0254598 | A1 | * | 10/2012 | Mikuszewski et al. ........... 713/1 |
| 2013/0159559 | A1 | * | 6/2013 | Hess ............................... 710/14 |

* cited by examiner

*Primary Examiner* — Michael Sun
(74) *Attorney, Agent, or Firm* — McNees Wallace & Nurick LLC (57) ABSTRACT

A first electronic device has a first side provided with first and second contacts. The first contact is connected to a direct current power source and the second contact is grounded. A second electronic device has a decision circuit and a second side removably connected to the first side. The second side includes third and fourth contacts. When the first and second electronic devices are connected in a first configuration, the decision circuit outputs a first signal according to the first configuration, whereas when the electronic devices are connected in a second configuration opposite to the first configuration, the decision circuit outputs a second signal according to the second configuration.

11 Claims, 7 Drawing Sheets

COMPUTER SYSTEM

CROSS-REFERENCE TO RELATED APPLICATION

This application claims priority of Taiwan application no. 101144147, filed on Nov. 26, 2012.

BACKGROUND OF THE INVENTION

1. Field of the Invention

The present invention relates to a computer system.

2. Description of the Related Art

Tablet computers are becoming more similar with notebook computers, with the main difference residing in the presence or absence of a physical keyboard. Therefore, more and more tablet computers now can be assembled and be combined with an expansion base having a physical keyboard. This enables the user to choose from a standalone tablet computer or a tablet computer combined with a physical keyboard.

Figure 1:
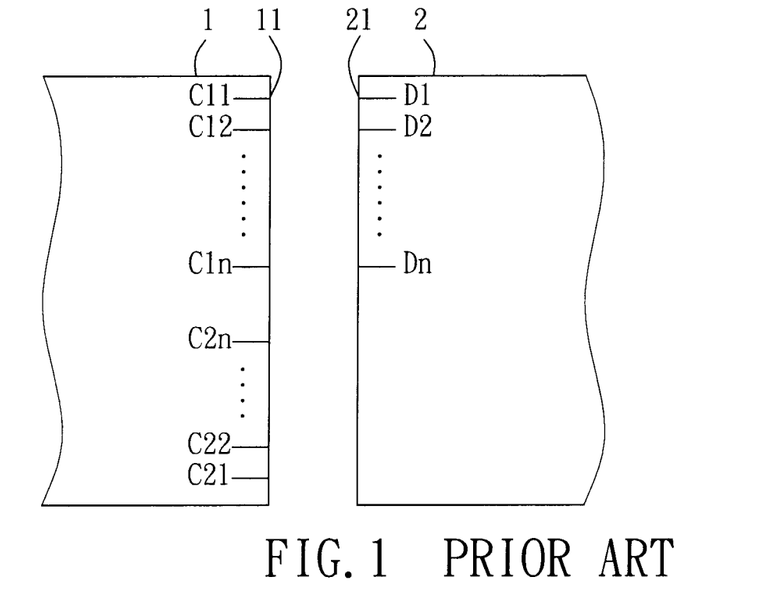
FIG. 1 is a schematic illustration illustrating that one set of signal contacts on a first side corresponding with a set of signal contacts of a second side when a tablet computer is connected with an expansion base in a first configuration according to the prior art.
Figure 2:
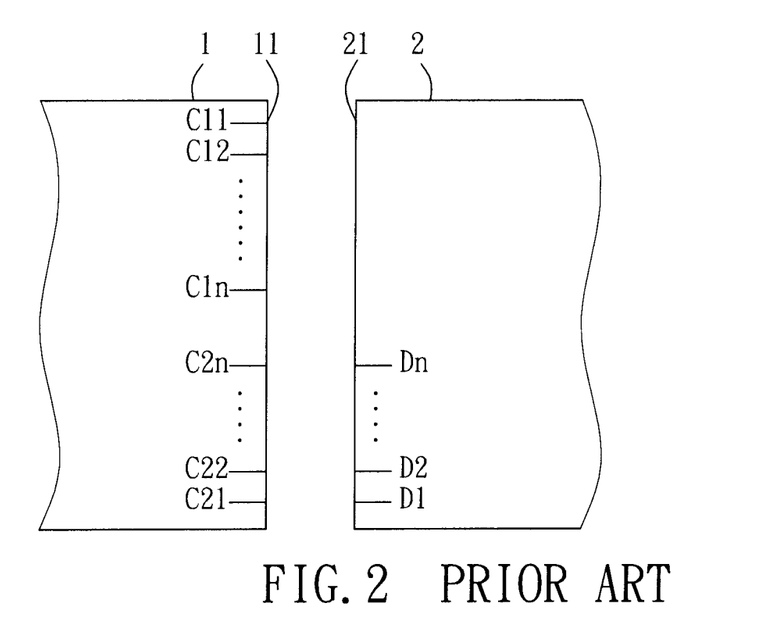
FIG. 2 is a schematic illustration illustrating that the other set of signal contacts on the first side corresponding with the set of signal contacts of the second side when the tablet computer is connected with the expansion base in a second configuration according to the prior art.

The tablet computer can be combined such that the display panel faces towards or away from the physical keyboard. As illustrated in FIGS. 1 and 2, a first side 11 of the tablet computer 1 connects with a second side 21 of an expansion base 2. The first side 11 includes two sets of signal contacts (pins or legs) C11-C1$n$ and C21-C2$n$ that are arranged along a straight line. This enables either set of signal contacts C11-C1$n$, C21-C2$n$ to be coupled electrically with a corresponding set of signal contacts D1-Dn in the expansion base 2 for signals to be transmitted, no matter which direction the tablet computer 1 is connected with the expansion base 2.

Figure 3:
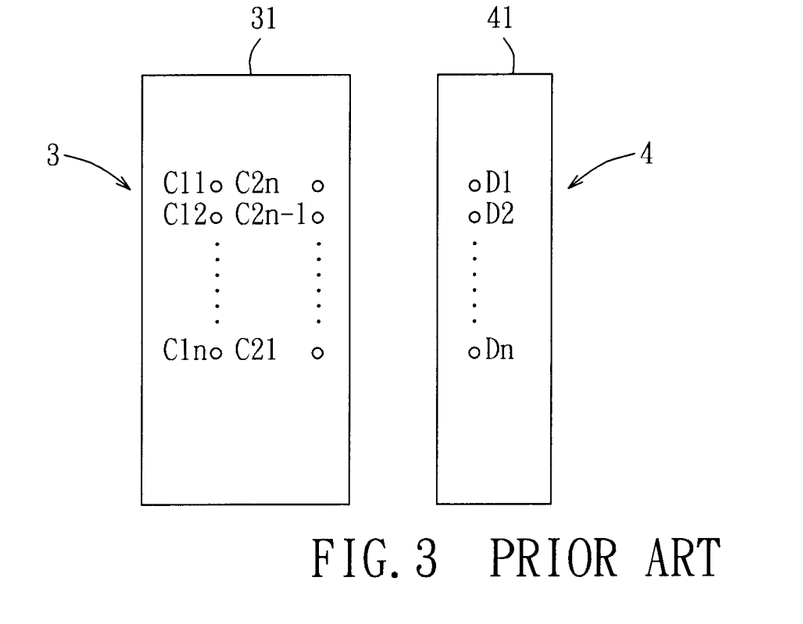
FIG. 3 is a schematic illustration illustrating a first side including two sets of signal contacts (pins or legs) that are arranged in parallel in the middle of the first side according to the prior art.

Alternatively, as illustrated in FIG. 3, a first side 31 of the tablet computer 3 connects with a second side 41 of an expansion base 4. The first side 31 includes two sets of signal contacts (pins or legs) C11-C1$n$ and C2$n$-C21 that are arranged in parallel in the center of the first side 31. This enables either set of signal contacts C11-C1$n$, C2$n$-C21 to be coupled electrically with a corresponding set of signal contacts D1-Dn in the expansion base 4 for signals to be transmitted, no matter which direction the tablet computer 3 is connected with the expansion base 4.

However, the above-mentioned designs use an extra set of signal contacts that occupies extra space in the tablet computer 1, 3. The design as illustrated in FIG. 3 has the drawback of increased thickness that is undesirable for a design of a thin and light tablet computer 3.

SUMMARY OF THE INVENTION

The object of the present invention is to provide a computer system that can reduce the number of required signal contacts, ensure the correctness of signal transmission, and meet the design needs of a thin form factor in designing electronic devices.

According to the present invention, there is provided a computer system that comprises:

a first electronic device having a first side, the first side being provided with a first contact and a second contact, the first contact being connected to a first direct current power source, the second contact being grounded; and a second electronic device having a decision circuit and a second side removably connected to the first side of the first electronic device, the second side being provided with a third contact disposed to correspond to one of the first contact and the second contact and a fourth contact disposed to correspond to the other one of the first contact and the second contact, the third contact and the fourth contact being coupled electrically to the decision circuit;

wherein when the first side of the first electronic device is connected to the second side of the second electronic device such that the first contact is electrically coupled with the third contact and that the second contact is electrically coupled with the fourth contact, the decision circuit detects a current outputted from the first direct current power source flowing from the first contact towards the third contact, determines that the first electronic device and the second electronic device are connected in a first configuration, and outputs a first signal according to the first configuration; and wherein when the first side of the first electronic device is connected to the second side of the second electronic device such that the first contact is electrically coupled with the fourth contact and that the second contact is electrically coupled with the third contact, the decision circuit detects a current outputted from the first direct current power source flowing from the first contact towards the fourth contact, determines that the first electronic device and the second electronic device are connected in a second configuration opposite to the first configuration, and outputs a second signal according to the second configuration.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
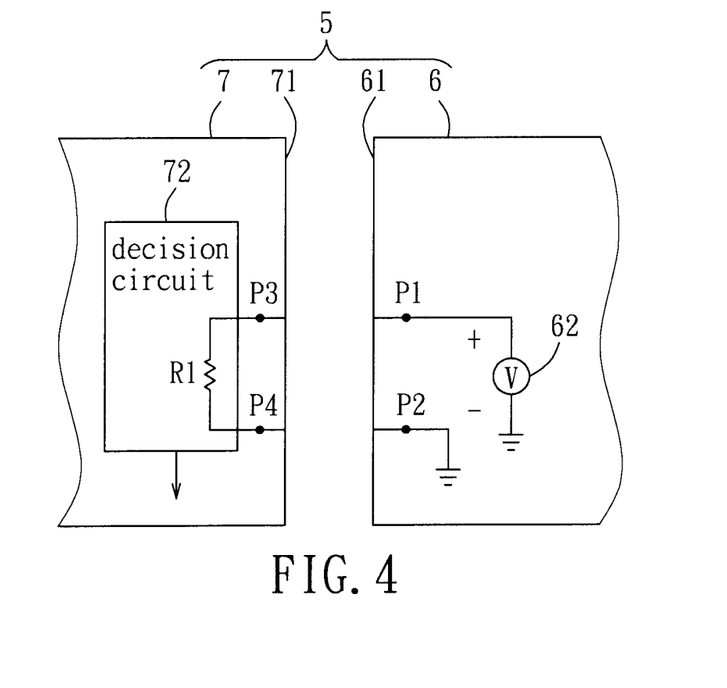
FIG. 4 is a schematic illustration illustrating circuits of a first electronic device and a second electronic device of a computer system according to this invention.

Referring to FIG. 4, the computer system 5 of this invention includes a first electronic device 6 and a second electronic device 7 that can be removably connected and electrically coupled with each other. The first electronic device 6 has a first side 61, and the first side 61 is provided with a first contact P1 and a second contact P2 (pins or legs). The first contact P1 is connected to a first direct current power source 62, and the second contact P2 is grounded.

The second electronic device 7 has a second side 71 removably connected to the first side 61 of the first electronic device 6. The second side 71 is provided with a third contact P3 disposed to correspond to one of the first contact P1 and the second contact P2, and a fourth contact P4 disposed to correspond to the other one of the first contact P1 and the second contact P2. The second electronic device 7 further includes a decision circuit 72 coupled electrically to the third contact P3 and the fourth contact P4.

Figure 5:
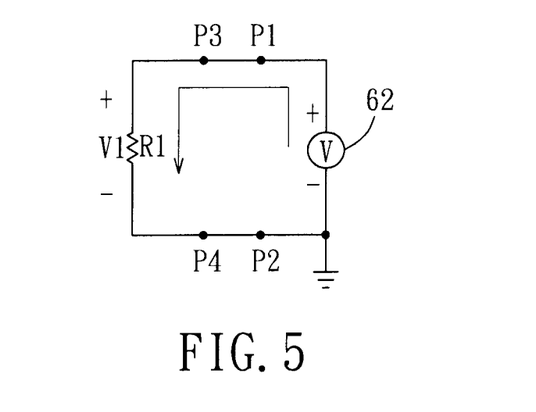
FIG. 5 is a schematic illustration of the circuit connection when the first electronic device and the second electronic device are connected in a first configuration.

As illustrated in FIG. 5, when the first side 61 of the first electronic device 6 is connected to the second side 71 of the second electronic device 7 such that the first contact P1 is electrically coupled with the third contact P3 and that the second contact P2 is electrically coupled with the fourth contact P4, the decision circuit 72 detects a current outputted from the first direct current power source 62 flowing from the first contact P1 towards the third contact P3, determines that the first electronic device 6 and the second electronic device 7 are connected in a first configuration, and outputs a first signal according to the first configuration. On the other hand, as illustrated in FIG. 6, when the first side 61 of the first electronic device 6 is connected to the second side 71 of the second electronic device 7 such that the first contact P1 is electrically coupled with the fourth contact P4 and that the second contact P2 is electrically coupled with the third contact P3, the decision circuit 72 detects a current outputted from the first direct current power source 62 flowing from the first contact P1 towards the fourth contact P4, determines that the first electronic device 6 and the second electronic device 7 are connected in a second configuration opposite to the first configuration, and outputs a second signal according to the second configuration.

Specifically, the decision circuit 72 includes a first resistor R1. One terminal of the first resistor R1 is electrically coupled with the third contact P3 and the other terminal of the first resistor R1 is electrically coupled with the fourth contact P4. As illustrated in FIG. 5, when the first electronic device 6 and the second electronic device 7 are connected in a configuration such that the first contact P1 is electrically coupled with the third contact P3 and the second contact P2 is electrically coupled with the fourth contact P4, the current outputted from the first direct current power source 62 flows from the first contact P1 towards the third contact P3, forming a first voltage V1 across the first resistor R1. The decision circuit 72 then determines, in response to the first voltage V1, that the first electronic device 6 and the second electronic device 7 are connected in the first configuration, and outputs the first signal according to the first configuration.

Figure 6:
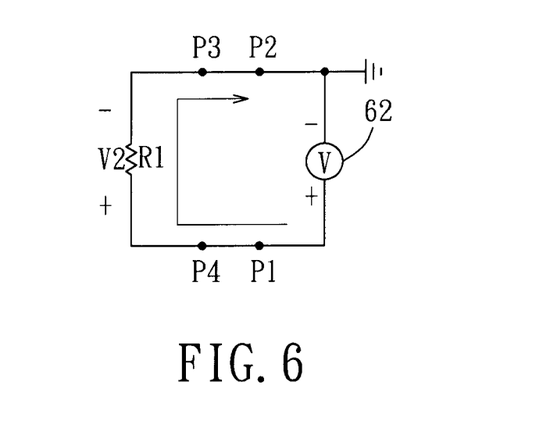
FIG. 6 is a schematic illustration of the circuit connection when the first electronic device and the second electronic device are connected in a second configuration.

On the other hand, as illustrated in FIG. 6, when the first electronic device 6 and the second electronic device 7 are connected in a configuration such that the first contact P1 is electrically coupled with the fourth contact P4 and the second contact P2 is electrically coupled with the third contact P3, the current outputted from the first direct current power source 62 flows from the first contact P1 towards the fourth contact P4, forming a second voltage V2 across the first resistor R1 that is opposite in polarity with respect to the first voltage V1. The decision circuit 72 then determines, in response to the second voltage V2, that the first electronic device 6 and the second electronic device 7 are connected in the second configuration, and outputs the second signal according to the second configuration.

Figure 7:
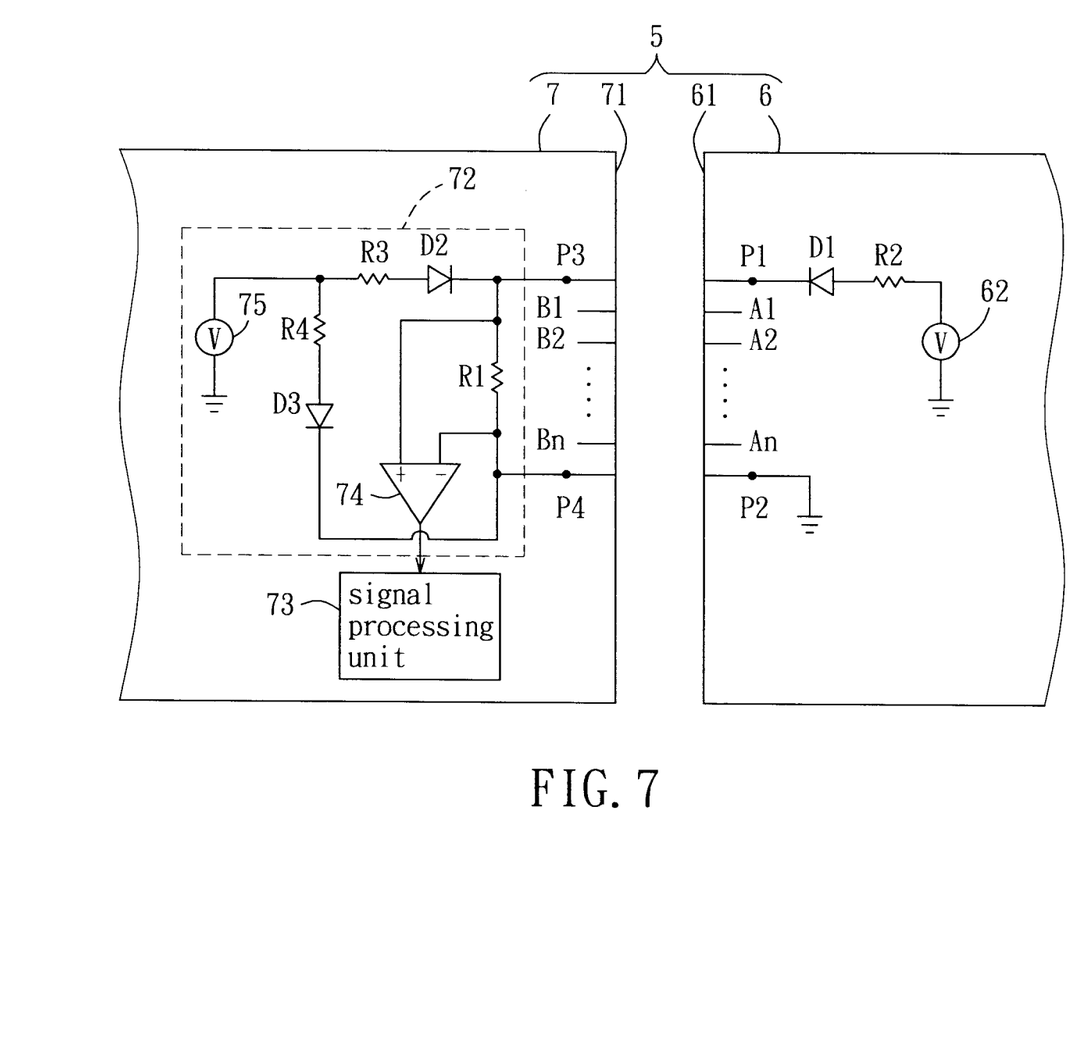
FIG. 7 is a schematic illustration illustrating circuits of a first electronic device and a second electronic device of a first preferred embodiment of the computer system of the present invention.

FIG. 7 illustrates the first preferred embodiment of the computer system 5. In the first electronic device 6, the first contact P1 and the second contact P2 are disposed away from each other and are symmetrical about a center of the first side 61. The first electronic device 6 further includes a plurality of first signal contacts (An) that are provided on the first side 61, that are arranged in a sequential order and that are disposed between the first contact P1 and the second contact P2. In the second electronic device 7, the third contact P3 and the fourth contact P4 are disposed away from each other and are symmetrical about a center of the second side 71. The second electronic device 7 further includes a plurality of second signal contacts (B1, B2 . . . Bn) provided on the second side 71 and corresponding in number and locations to the first signal contacts (A1, A2 . . . An).

The first electronic device 6 further includes a second resistor R2 and a first diode D1. One terminal of the second resistor R2 is electrically coupled with a positive terminal of the first direct current power source 62, and the other terminal is electrically coupled with an anode terminal of the first diode D1. The cathode terminal of the first diode D1 is electrically coupled with the first contact P1.

The second electronic device 7 further includes a signal processing unit 73 electrically coupled to the second signal contacts (Bn) and the decision circuit 72. The decision circuit 72 further includes an operational amplifier 74, a second diode D2, a third resistor R3, a fourth resistor R4, a third diode D3, and a second direct current power source 75. The operational amplifier 74 has a first input electrically coupled with the third contact P3 and a second input electrically coupled with the fourth contact P4. The cathode of the second diode D2 is electrically coupled with the third contact P3, and the anode of the second diode D2 is electrically coupled with one terminal of the third resistor R3. The other terminal of the third resistor R3 is electrically coupled with the positive terminal of the second direct current power source 75 and one terminal of the fourth resistor R4. The other terminal of the fourth resistor R4 is electrically coupled with the anode of the third diode D3, and the cathode of the third diode D3 is electrically coupled with the fourth contact P4. The output terminal of the operational amplifier 74 is electrically coupled with the signal processing unit 73. In this preferred embodiment, the first resistor R1, the second resistor R2, the third resistor R3 and the fourth resistor R4 have the same resistance value, and the voltages outputted from the first direct current power source 62 and the second direct current power source 75 are the same.

Figure 8:
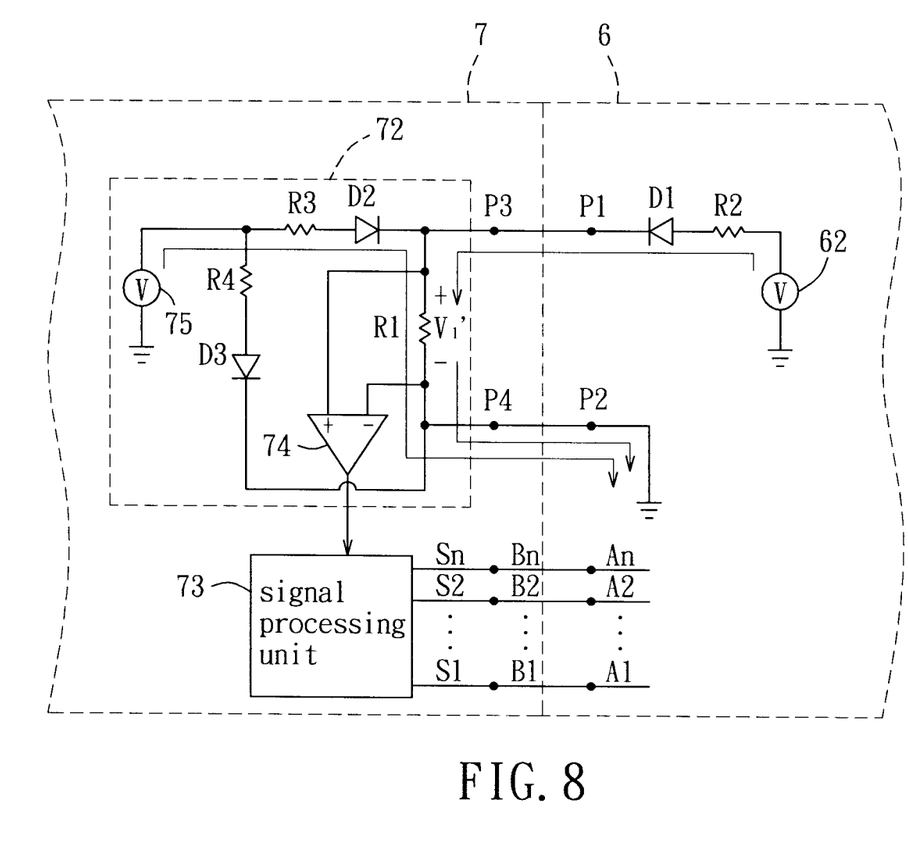
FIG. 8 is a schematic illustration illustrating the circuit connection of the first electronic device and the second electronic device of the first preferred embodiment connected in a first configuration.

As illustrated in FIG. 7, when the first electronic device 6 is disconnected from the second electronic device 7, the first contact P1, the third contact P3 and the fourth contact P4 are at a corresponding first voltage level. When the first electronic device 6 and the second electronic device 7 are connected in the first configuration, the first contact P1 and the third contact P3 are electrically coupled and are at a second voltage level that is lower than the corresponding first voltage level, the fourth contact P4 is grounded through the second contact P2, and the first signal contacts (A1, A2 ... An) are electrically coupled with the second signal contacts (B1, B2 ... Bn) in a corresponding first order. As shown in FIG. 8, when the first contact P1 and the third contact P3 are at a second voltage level that is lower than the corresponding first voltage level, and the fourth contact P4 is grounded through the second contact P2, the decision circuit 72 recognizes that the first electronic device 6 and the second electronic device 7 are connected electrically in the first configuration. Concurrently, the current outputted from the first direct current power source 62 is able to flow through the second resistor R2, the first diode D1, the first contact P1, the third contact P3, the first resistor R1, the fourth contact P4 and the second contact P2 to ground, and/or a current outputted from the second direct current power source 75 is able to flow through the third resistor R3, the second diode D2, the first resistor R1, the fourth contact P4 and the second contact P2 to the ground. A first voltage V1' is thus formed on the first resistor R1 between the third contact P3 and the fourth contact P4, causing the operational amplifier 74 to output the first signal (high reference signal) to the signal processing unit 73. The signal processing unit 73 sends signals (S1-Sn) intended for the second signal contacts to the second signal contacts (B1, B2 ... Bn) in a corresponding first order (S1, S2 ... Sn).

Figure 9:
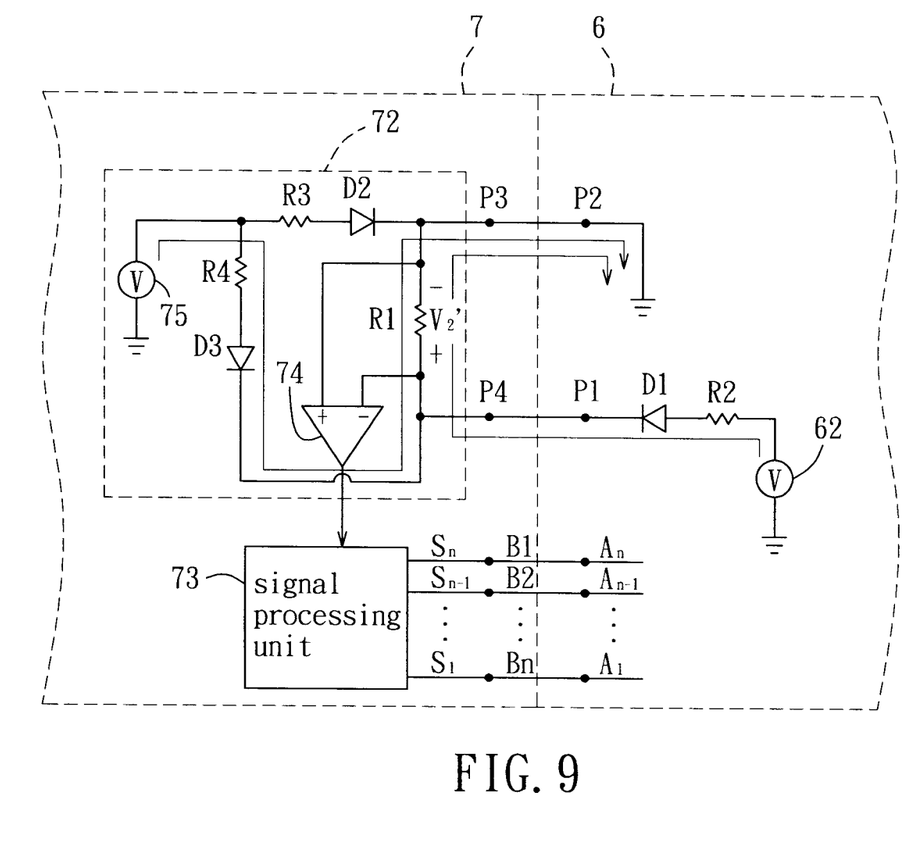
FIG. 9 is a schematic illustration illustrating the circuit connection of the first electronic device and the second electronic device of the first preferred embodiment connected in a second configuration.

On the other hand, as shown in FIG. 9, when the first electronic device 6 and the second electronic device 7 are connected in the second configuration, the first contact P1 and the fourth contact P4 are electrically coupled, the third contact P3 is grounded through the second contact P2, and the first signal contacts (An, An−1 ... A1) are electrically coupled with the second signal contacts (B1, B2 ... Bn) in a corresponding second order opposite to the first order. As shown in FIG. 9, when the first contact P1 and the fourth contact P4 are at a second voltage level that is lower than the corresponding first voltage level, and the third contact P3 is grounded through the second contact P2, the decision circuit 72 recognizes that the first electronic device 6 and the second electronic device 7 are connected electrically in the second configuration. Concurrently, the current outputted from the first direct current power source 62 is able to flow through the second resistor R2, the first diode D1, the first contact P1, the fourth contact P4, the first resistor R1, the third contact P3 and the second contact P2 to ground, and/or a current outputted from the second direct current power source 75 is able to flow through the fourth resistor R4, the third diode D3, the first resistor R1, the third contact P3 and the second contact P2 to the ground. A second voltage V2' opposite in polarity to the first voltage V1' is thus formed on the first resistor R1 between the third contact P3 and the fourth contact P4, causing the operational amplifier 74 to output the second signal (low reference signal) to the signal processing unit 73. The signal processing unit 73 sends signals (S1-Sn) intended for the second signal contacts to the second signal contacts (B1, B2 ... Bn) in a corresponding second order (Sn, Sn−1 ... S1), enabling the first signal contacts (An, An−1 ... A1) to be able to correctly receive the signals sent from the second electronic device 7. Similarly, the signals sent from the first signal contacts (An, An−1 ... A1) to the second signal contacts (B1, B2 ... Bn) will first be reversed in order by the signal processing unit 73.

Figure 10:
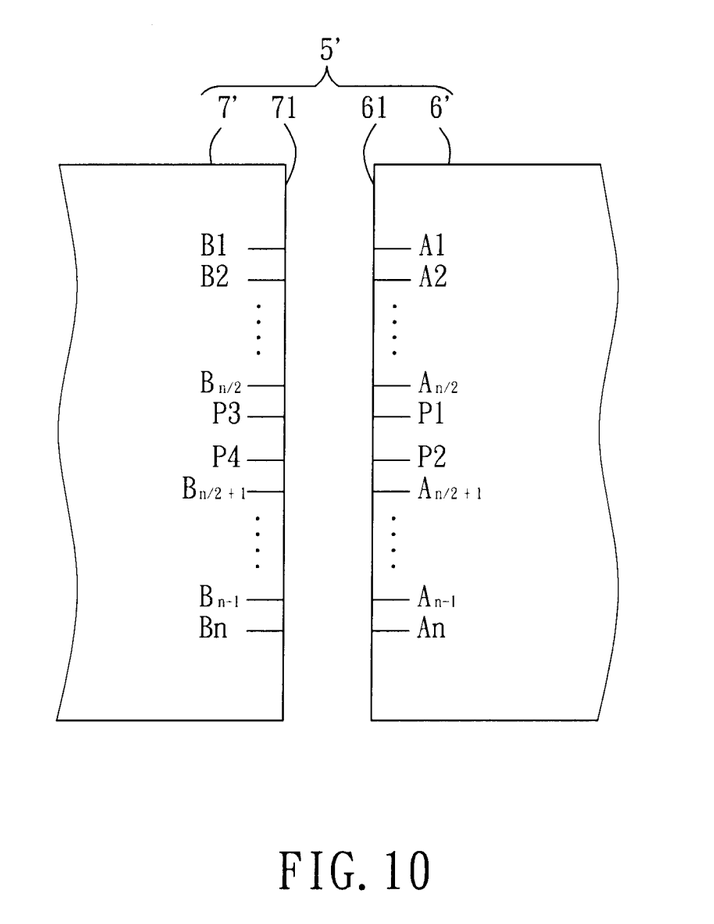
FIG. 10 is a schematic illustration illustrating the positions of a first and second contacts and a plurality of first signal contacts of a first electronic device and third and fourth contacts and a plurality of second signal contacts of a second electronic device in a second preferred embodiment of the computer system of the present invention.

The second preferred embodiment of the computer system as shown in FIG. 10 differs from the first preferred embodiment in that: the first electronic device 6' has an even number of first signal contacts (An) provided on the first side 61, the first contact P1 and the second contact P2 are disposed adjacent to each other and in a central part of the first side 61, and the first signal contacts (A1-An) are arranged symmetrically and evenly on two sides of the first contact P1 and the second contact P2. Similarly, the second electronic device 7' has an even number of second signal contacts (B1-Bn) provided on the second side 71 and corresponding in number to the first signal contacts (A1-An), the third contact P3 and the fourth contact P4 are disposed adjacent to each other and in a central part of the second side 71, and the second signal contacts (B1-Bn) are arranged symmetrically and evenly on two sides of the third contact P3 and the fourth contact P4. As a result, it does not matter whether the first electronic device 6' and the second electronic device 7' are connected in the first or second configuration, the first contact P1, the second contact P2 of the first side 61 and the first signal contacts (A1-An) are connected with the third contact P3, the fourth contact P4 of the second side 71 and the second signal contacts (B1-Bn) correctly.

In one example, the first electronic device 6, 6' can be a tablet computer, and the second electronic device 7, 7' can be an expansion base of the tablet computer. The expansion base includes a physical keyboard and other peripheral devices or functions that the tablet computer does not include. In another example, the second electronic device 7, 7' can be a tablet computer, and the first electronic device 6, 6' can be an expansion base of the tablet computer. Te present invention is not limited to the above examples.

In summary, as described in the embodiments, the first side 61 of the first electronic device 6, 6' and the second side 71 of the second electronic device 7, 7' each has a pair of contacts that correspond to the other pair. According to the voltage levels of the pairs of contacts P1, P2, P3, P4, it can be determined whether the first electronic device 6, 6' and the second electronic device 7, 7' are connected in the first configuration or the second configuration. Accordingly, the decision circuit 72 determines whether to reverse the order of the signals (S1-Sn) that are to be sent, or whether to reverse the order of the signals (S1-Sn) received from the first electronic device 6, 6' so that they can be in the correct order. As compared to the prior art, the computer system of the present invention reduces the number of required signal contacts, ensures the correctness of signal transmission, and meets the design needs of a thin form factor in designing electronic devices.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A computer system, comprising:
   a first electronic device having a first side, the first side being provided with a first contact and a second contact, the first contact being connected to a first direct current power source, the second contact being grounded; and
   a second electronic device having a decision circuit and a second side removably connected to the first side of the first electronic device, the second side being provided with a third contact disposed to correspond to one of the first contact and the second contact and a fourth contact disposed to correspond to the other one of the first contact and the second contact, the third contact and the fourth contact being coupled electrically to the decision circuit;
   wherein when the first side of the first electronic device is connected to the second side of the second electronic device such that the first contact is electrically coupled with the third contact and that the second contact is electrically coupled with the fourth contact, the decision circuit detects a current outputted from the first direct current power source flowing from the first contact towards the third contact, determines that the first electronic device and the second electronic device are connected in a first configuration, and outputs a first signal according to the first configuration; and wherein when the first side of the first electronic device is connected to the second side of the second electronic device such that the first contact is electrically coupled with the fourth contact and that the second contact is electrically coupled with the third contact, the decision circuit detects a current outputted from the first direct current power source flowing from the first contact towards the fourth contact, determines that the first electronic device and the second electronic device are connected in a second configuration opposite to the first configuration, and outputs a second signal according to the second configuration.

2. The computer system as claimed in claim 1, wherein the decision circuit includes a first resistor, and one terminal of the first resistor is electrically coupled with the third contact and the other terminal of the first resistor is electrically coupled with the fourth contact;

wherein when the first contact is electrically coupled with the third contact and the second contact is electrically coupled with the fourth contact, the current flowing from the first contact towards the third contact is associated with a first voltage across the first resistor, and when the first contact is electrically coupled with the fourth contact and the second contact is electrically coupled with the third contact, the current flowing from the first contact towards the fourth contact is associated with a second voltage across the first resistor that is opposite in polarity with respect to the first voltage;

wherein the decision circuit determines, in response to the first voltage, that the first electronic device and the second electronic device are connected in the first configuration, and outputs the first signal according to the first configuration; and wherein the decision circuit determines, in response to the second voltage, that the first electronic device and the second electronic device are connected in the second configuration, and outputs the second signal according to the second configuration.

3. The computer system as claimed in claim 2, wherein the first electronic device further includes a first series connection formed by a second resistor and a first diode, the first series connection being electrically coupled between the first contact and a positive terminal of the first direct current power source;

wherein the decision circuit of the second electronic device further includes an operational amplifier, a second series connection formed by a second diode and a third resistor, a third series connection formed by a fourth resistor and a third diode, and a second direct current power source;

wherein the operational amplifier has a first input electrically coupled with the third contact and a second input electrically coupled with the fourth contact, the second series connection is electrically coupled between the third contact and a positive terminal of the second direct current power source, and the third series connection is electrically coupled between the fourth contact and the positive terminal of the second direct current power source.

4. The computer system as claimed in claim 3, wherein:

a terminal of the second resistor is electrically coupled with the positive terminal of the first direct current power source, the other terminal of the second resistor is electrically coupled with an anode of the first diode, and a cathode of the first diode is electrically coupled with the first contact; and a cathode of the second diode is electrically coupled with the third contact, an anode of the second diode is electrically coupled with one terminal of the third resistor, the other terminal of the third resistor is electrically coupled with the positive terminal of the second direct current power source and one terminal of the fourth resistor, the other terminal of the fourth resistor is electrically coupled with an anode of the third diode, and a cathode of the third diode is electrically coupled with the fourth contact.

5. The computer system as claimed in claim 3, wherein:

the first contact, the third contact and the fourth contact are at a corresponding first voltage level when the first electronic device is disconnected from the second electronic device;

when the first electronic device and the second electronic device are connected in the first configuration, the first contact and the third contact are at a second voltage level that is lower than the corresponding first voltage level, and the fourth contact is grounded through the second contact; and when the first electronic device and the second electronic device are connected in the second configuration, the first contact and the fourth contact are at a third voltage level that is lower than the corresponding first voltage level, and the third contact is grounded through the second contact.

6. The computer system as claimed in claim 3, wherein:

when the first electronic device and the second electronic device are connected in the first configuration, the current outputted from the first direct current power source is able to flow through the first series connection, the first contact, the third contact, the first resistor, the fourth contact and the second contact to ground, and a current outputted from the second direct current power source is able to flow through the second series connection, the first resistor, the fourth contact and the second contact to the ground; and when the first electronic device and the second electronic device are connected in the second configuration, the current outputted from the first direct current power source is able to flow through the first series connection, the first contact, the fourth contact, the first resistor, the third contact and the second contact to the ground, and the current outputted from the second direct current power source is able to flow through the third series connection, the first resistor, the third contact and the second contact to the ground.

7. The computer system as claimed in claim 1, wherein:

the first electronic device further has a plurality of first signal contacts provided on the first side and arranged in a sequential order;

the second electronic device further has a plurality of second signal contacts provided on the second side and corresponding in number to the first signal contacts, and a signal processing unit electrically coupled to the second signal contacts and the decision circuit;

when the signal processing unit receives the first signal according to the first configuration, the signal processing unit sends signals intended for the second signal contacts to the second signal contacts in a corresponding first order; and when the signal processing unit receives the second signal according to the second configuration, the signal processing unit sends the signals intended for the second signal contacts to the second signal contacts in a corresponding second order opposite to the first order.

8. The computer system as claimed in claim 7, wherein the first contact and the second contact are disposed away from each other and are symmetrical about a center of the first side, and the third contact and the fourth contact are disposed away from each other and are symmetrical about a center of the second side; and wherein the first signal contacts are disposed between the first contact and the second contact, and the second signal contacts are disposed between the third contact and the fourth contact.

9. The computer system as claimed in claim 1, wherein the first electronic device has an even number of first signal contacts provided on the first side, the first contact and the second contact are disposed adjacent to each other and in a central part of the first side, and the first signal contacts are arranged symmetrically and evenly on two sides of the first contact and the second contact; and wherein the second electronic device has an even number of second signal contacts provided on the second side and corresponding in number to the first signal contacts, the third contact and the fourth contact are disposed adjacent to each other and in a central part of the second side, and the second signal contacts are arranged symmetrically and evenly on two sides of the third contact and the fourth contact.

10. The computer system as claimed in claim 1, wherein the first electronic device is a tablet computer, and the second electronic device is an expansion base.

11. The computer system as claimed in claim 1, wherein the first electronic device is an expansion base, and the second electronic device is a tablet computer.

* * * * *